(12) United States Patent
Meital et al.

(10) Patent No.: US 10,601,974 B2
(45) Date of Patent: Mar. 24, 2020

(54) ADAPTER FOR ATTACHING A HEADPHONES DEVICE TO A HELMET

(71) Applicant: CARDO SYSTEMS, INC., Pittsburgh, PA (US)

(72) Inventors: Erez Meital, Mazkeret Batya (IL); Uri Gilboa, Givatayim (IL)

(73) Assignee: Cardo Systems, Ltd., Ra'anana (IL)

( * ) Notice: Subject to any disclaimer, the term of this patent is extended or adjusted under 35 U.S.C. 154(b) by 0 days.

(21) Appl. No.: 16/221,764

(22) Filed: Dec. 17, 2018

(65) Prior Publication Data
US 2019/0141175 A1    May 9, 2019

Related U.S. Application Data

(62) Division of application No. 15/116,162, filed as application No. PCT/IL2015/050112 on Feb. 2, 2015, now abandoned.

(30) Foreign Application Priority Data

Feb. 3, 2014   (IL) .......................................... 230802

(51) Int. Cl.
*A42B 3/30*     (2006.01)
*H04M 1/05*     (2006.01)
*H04M 1/60*     (2006.01)

(52) U.S. Cl.
CPC ................. *H04M 1/05* (2013.01); *A42B 3/30* (2013.01); *A42B 3/303* (2013.01); *H04M 1/6066* (2013.01); *H04M 2250/02* (2013.01)

(58) Field of Classification Search
CPC .. H04M 1/05; H04M 1/6066; H04M 2250/02; A42B 3/303; A42B 3/30
See application file for complete search history.

(56) References Cited

U.S. PATENT DOCUMENTS

| 6,075,857 | A  | 6/2000  | Doss, Jr. et al. |
| 8,054,042 | B2 | 11/2011 | Griffin |
| 8,245,326 | B1 | 8/2012  | Tolve |
| 2006/0057972 | A1 | 3/2006 | Wikel et al. |

FOREIGN PATENT DOCUMENTS

| FR | 2827744    | 1/2003 |
| IL | 106291     | 4/1995 |
| WO | 2011/101721 | 8/2011 |

OTHER PUBLICATIONS

Stening, Belinda; "Cookie Fuel skydiving helmet", Sep. 19, 2013.
Supplementary European Search Report filed in EP 15 74 3939 dated Aug. 14, 2017.
International Search Report filed in PCT/IL2015/050112 dated May 14, 2015.

*Primary Examiner* — Jack W Lavinder
(74) *Attorney, Agent, or Firm* — Rankin, Hill & Clark LLP

(57) ABSTRACT

The invention relates to a replaceable adaptor for attaching a headset device to a helmet, which comprises: (a) a lower portion at a lower level having a shape suitable to be accommodated within a helmet cavity at the helmet; and (b) an adaptor cavity which is adapted to accommodate said headset device; wherein when a need is arisen to attach another headset having a different shape or dimensions to a same helmet, or when a need is arisen to replace the helmet by another helmet having a cavity of different shape or dimensions, said adaptor is replaced accordingly.

8 Claims, 3 Drawing Sheets

ADAPTER FOR ATTACHING A HEADPHONES DEVICE TO A HELMET

FIELD OF THE INVENTION

The field of the invention relates in general to the field of helmets accessories. More specifically, the invention relates to an adapter for attaching a headphone of any shape to a helmet having a cavity of a specific shape.

BACKGROUND OF THE INVENTION

A headphones set (hereinafter, "headphones device", "Bluetooth device", or "Headset") is widely used in combination with helmets, particularly when a hand-free operation of the headphones is desired. In a particular example, headphones are widely used in combination with helmets for motorcyclists, or other sport or leisure activities (although the following description discusses a specific example of a helmet for a motorcyclist, this example should not be viewed as a limiting example, as the invention may be used in conjunction with any type of helmet). In recent years, headphones devices for motorcyclists have been significantly improved, particularly when the Bluetooth protocol has become feasible. Bluetooth headphones for motorcyclists now offer several of features that were impossible several years ago, such as:
  a. Miniaturization of the device;
  b. Communication between motorcyclists;
  c. Use of a wireless connection between the device and a communication "relay" within the motorcycle, which on one hand carries out the communication with similar devices of other motorcyclists, and on the other hand conveys communication to and from the driver's headphones;
  d. Hands free operation of the device;
  e. Connection to a telephone;
  f. Communication of emergency messages; and
  g. A variety of additional features.

It should be noted that that the term "Bluetooth device", "headphones device", and "headphones set", as used herein, all relate to a device which is provided in a closed casing, wherein the headphones are not a part of the device, as they are typically located within the helmet itself. Several types of Bluetooth devices for motorcyclists are manufactured and distributed, for example, by Cardo Systems Inc.

In view of the substantial difference in nature between the two, helmets and the Bluetooth headphones (particularly for motorcyclists) products, they are typically manufactured by different entities. The varieties headphone models that in many cases are manufactured by different manufacturers, naturally have various dimensions, shapes, and even electronics connectors. The helmet design, however, which is rigid, must provide a suitable space in advance for accommodating the Bluetooth device, while also providing appropriate connection means and environment for operation. Unfortunately, there is no standard with respect to the Bluetooth headphones attachment manner, shape, or dimensions, and such a standard is not foreseen in the coming future.

In order to enable accommodation of a Bluetooth device, several helmet manufacturers provide a cavity with connector that are accessible from external surface of the helmet. In some cases, the cavity and connector are covered at times of non-use, for example, by a plastic cover which is removed when a need arises to use the cavity. However, this cavity and connector is suitable for a specific product shape, dimensions, and connector arrangement, a situation which may be suitable for a specific device model, but unsuitable for most of the other Bluetooth devices in the market.

Another solution for attaching a headphone to a helmet is by means of adhesive of a clamp. However, this solution is not preferable, and suffers from various drawbacks.

It is therefore an object of the present invention to provide an adaptor for connecting a Bluetooth device to an existing cavity within a helmet, irrespective of the cavity or Bluetooth device shape, dimensions, or arrangement.

It is another object of the present invention to provide within said adaptor all the required means for a mechanical attachment and electronics connections to the helmet.

Other objects and advantages of the invention will become apparent as the description proceeds.

SUMMARY OF THE INVENTION

The invention relates to a replaceable adaptor for attaching a headset device to a helmet, which comprises: (a) a lower portion at a lower level having a shape suitable to be accommodated within a helmet cavity at the helmet; and (b) an adaptor cavity which is adapted to accommodate said headset device; wherein when a need arises to attach another headset device having a different shape or dimensions to a same helmet, or when a need arises to replace the helmet by another helmet having a cavity of different shape or dimensions, said adaptor is replaced with another adaptor having an adaptor cavity capable of accommodating said another headset device, or having lower portion shape suitable to be accommodated within the cavity of said another helmet, respectively.

Preferably, said adaptor cavity is provided at a higher level of the adaptor, above said lower level.

Preferably, the helmet and the adaptor comprise locking means for keeping said lower portion of the adaptor locked within said helmet cavity.

Preferably, the adaptor comprises locking means for keeping said headphones device locked within said adaptor cavity.

Preferably, the helmet cavity and the adaptor cavity are different in their shape, dimensions, or both.

Preferably, a first connector is provided at said lower portion of the adaptor, said first connector is adapted to mate with a respective helmet connector at said helmet cavity.

Preferably, a second connector is provided at said adaptor cavity, said second connector is adapted to mate with a respective connector at said headphones device.

Preferably, suitable wiring means are provided to connect between corresponding contacts of said first connector and said second connector.

Preferably, an opening is provided at the adaptor at the location of the cavity connector, and an additional single connector is provided to mate in one of its sides with said cavity connector, and to mate in its opposite side with said headset connector.

DETAILED DESCRIPTION OF PREFERRED EMBODIMENTS

Figure 1:
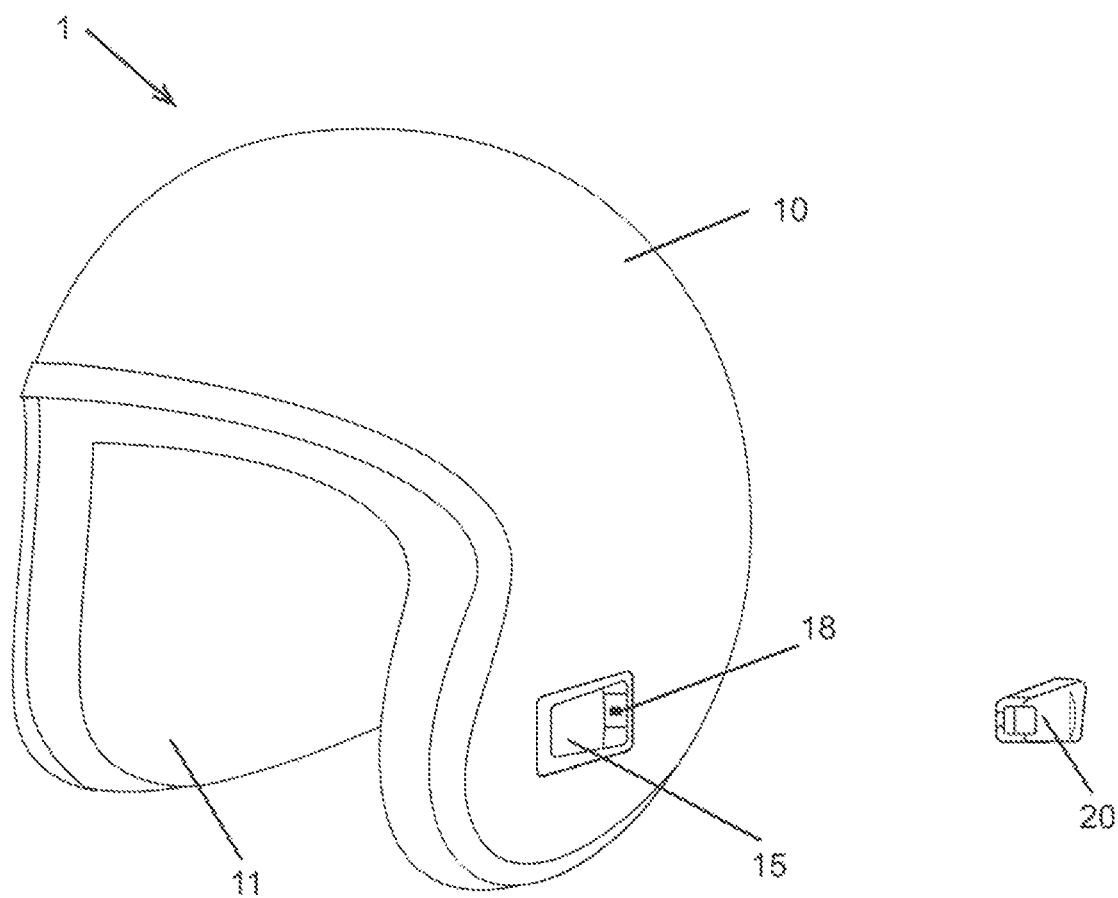
FIG. 1 shows a typical helmet and headphones device according to prior art.

FIG. 1 shows a motorcyclist helmet 1 according to the prior art. The helmet shown is typical in its structure and is made substantially of three layers: an exterior rigid plastic layer 10, an intermediate energy absorbing soft layer (not shown), typically made of a foamed polystyrene (EFS), and a textile layer 11 which is made soft for the user convenience, such as for absorbing sweat, adaptation to the shape of the user head, etc. The shapes of the layers are specific to each helmet, resulting from safety, aerodynamics, and aesthetic considerations. In order to accept a Bluetooth headphones device 20, some helmets are provided with a helmet cavity 15. In said preferable cases, The helmet cavity is made of plastic, and it extends through or from the rigid exterior layer 10, and through the intermediate layer. In such preferable cases, the helmet cavity further includes an electronic connector 18 for enabling connection between a headphones device and earphones that are located internally within the intermediate layer and the internal layer 11. In some other less preferable cases, the earphones are not pre-installed within the helmet, and they are connected and attached by the user externally.

As shown, the helmet cavity 15 has a shape to accept a specific Bluetooth device 20 of one specific model. The Bluetooth device 20 must conform to the helmet cavity 15, also in terms of the location of the connector 18, and it typically has locking means (not shown) for holding the device safely in place within the helmet cavity. Any device having a shape and/or connector which differs from the structure as provided within the helmet cavity, cannot be accommodated at the cavity, nor can it appropriately operate.

Figure 2:
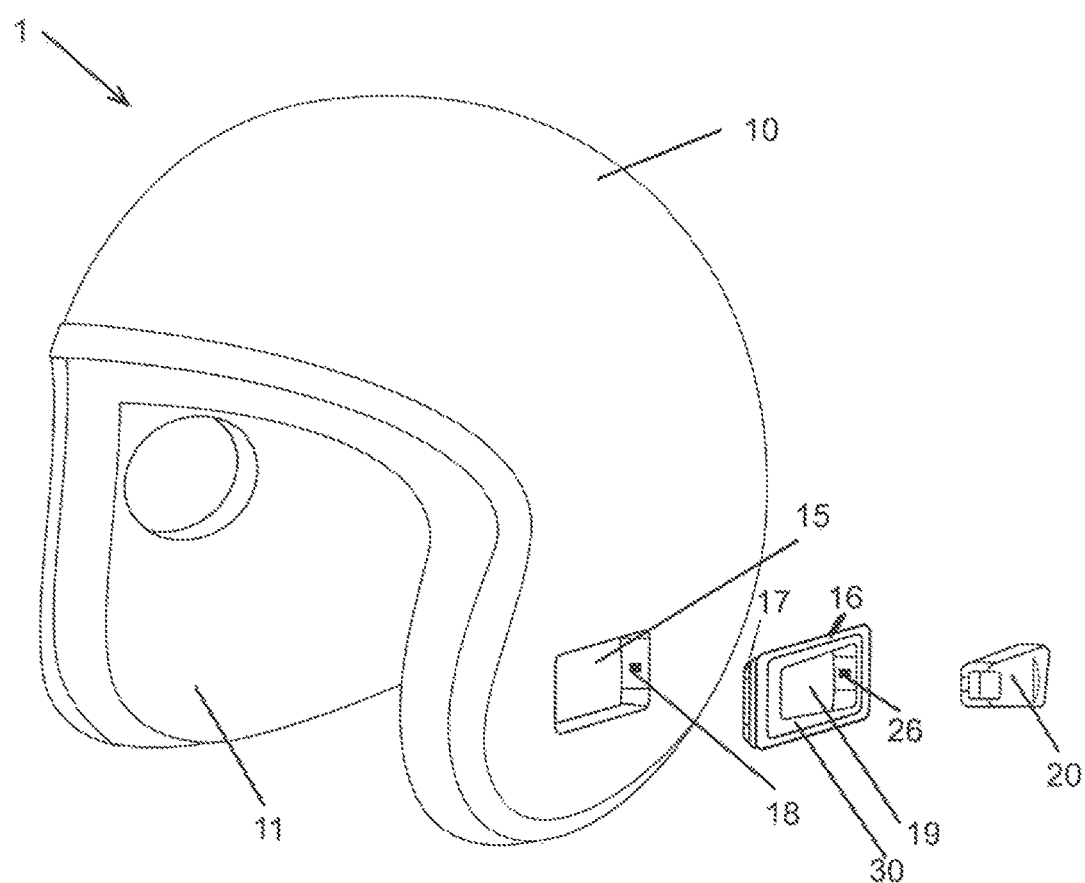
FIG. 2 shows a helmet, adaptor, and a headset device according to an embodiment of the invention.
Figure 3:
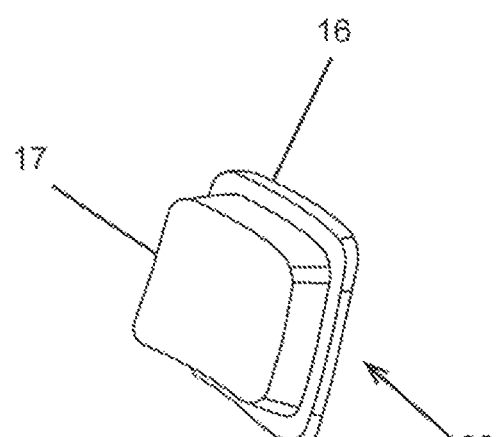
FIG. 3 shows a rear view of the adaptor, showing its lower portion (by "lower portion" it is mean to a portion which is deeper within the helmet, relative to its external surface)

FIG. 2 shows an adaptor 30 for enabling insertion of devices of various shapes into a helmet cavity of a given shape. FIG. 3 shows a rear view of said adaptor according to an embodiment of the invention. The adaptor 30 is typically made of plastic, and it is a two-level component. The lower level 17 of the component has a shape which substantially conforms to the shape of helmet cavity 15, and therefore it can be inserted into this cavity. Locking means (that are not shown in the figure) safely locks the lower level 17 of the adaptor 30 within the helmet cavity 15, while a higher level 16 of the adaptor protrudes from the level of the exterior layer 10, such that it can substantially have a larger or smaller periphery compared to the periphery of helmet cavity 15. The higher level 16 of adapter has an adapter cavity 19, which is adapted to accept the specific Bluetooth device 20, and therefore the shape of said adapter cavity 19 conforms to the shape of the specific device 20. In one embodiment, the adaptor 30 comprises a first connector (not shown) at the lower level 17 which is adapted for mating with connector 18 at the helmet cavity 15, and a second connector 26 at the higher level 16 for mating with a corresponding connector at the device 20. Optionally, wires may be provided to bridge between the contacts of said two connectors of adaptor 30. In another embodiment, the adaptor 30 has an opening (not shown) through which a single connector mates in one of its sides to the cavity connector, and in its opposite side to the headset.

The adaptor also comprises locking means at the higher level 16 for locking the device 20 within adaptor cavity 19.

The adaptor may optionally be provided with an antenna (not shown), which is connected to the device 20 via a connector at the higher level 17.

As shown, the adaptor 30 of the present invention enables connection of a device 20 having any shape to a helmet cavity 15 within the helmet 10 which is designed to accept a headphones device having a corresponding specific shape. As shown, only the lower level of adaptor 30 has to conform to the shape, and dimensions of helmet cavity 15, and to the connector 18 within the helmet. The upper level of the adaptor and the adaptor cavity 19 are designed to conform with the shape, dimensions, and connector of the specific headphones device 20. The adaptor is preferably designed to conform to the shape of the helmet, taking into account, among other considerations, also aerodynamics considerations.

Figure 4:
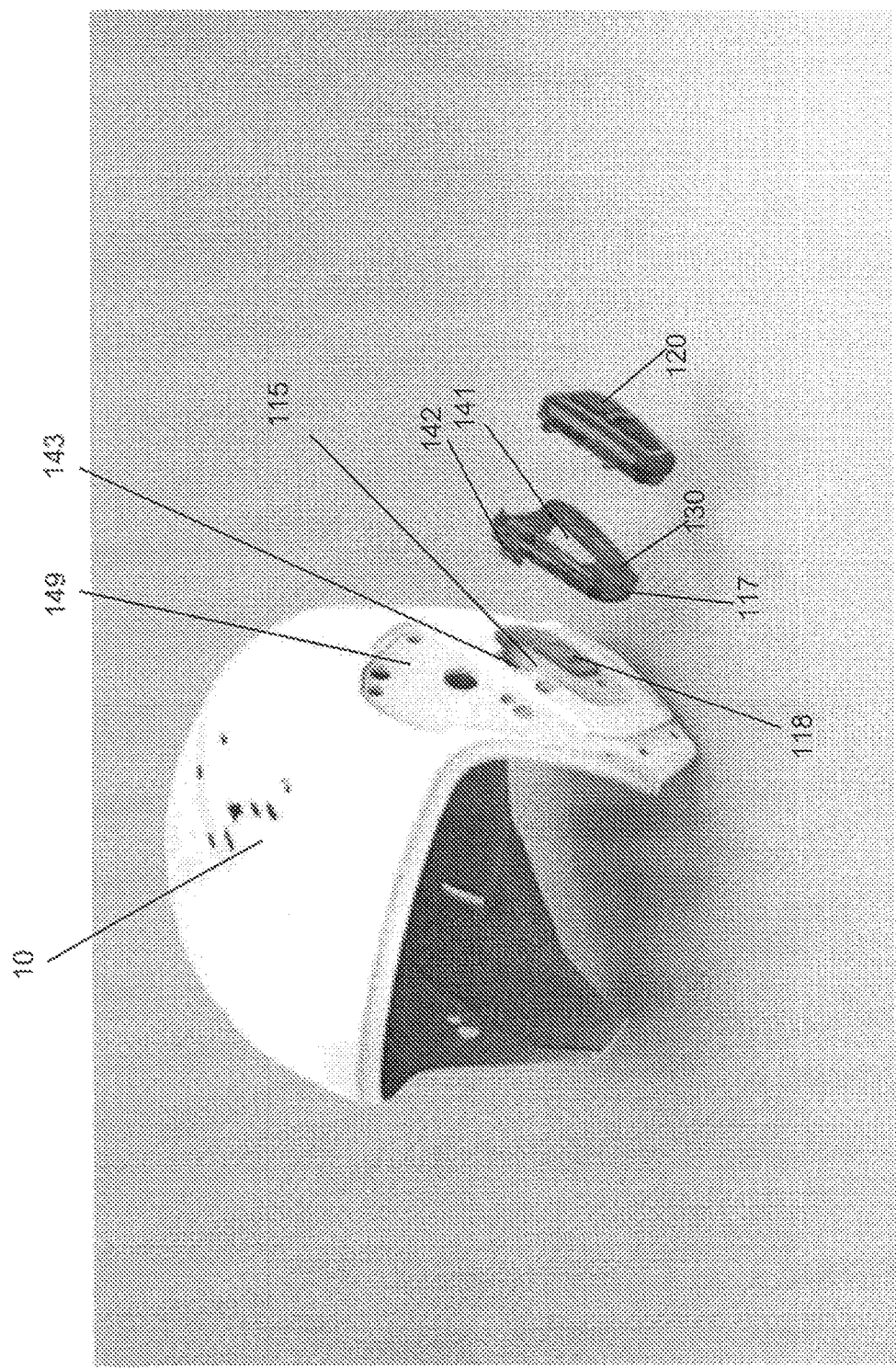
FIG. 4 shows still another view of the adaptor, headset, and helmet according to an embodiment of the present invention.

FIG. 4 shows still another embodiment of the invention. The adaptor 130 is similar in its structure to the adaptor 30 of FIGS. 2 and 3. Elements in FIG. 4 having similar numeral indication to those of FIGS. 2 and 3 also perform similar functions respectively; therefore, the description with respect to those elements will not be repeated. The adaptor 130 comprises an opening 141, through which the connector 118 enters to mate with a respective connector of the headset 120. The adaptor 142 also comprises clamping means 142 for attaching it with a corresponding arrangement at the cavity 115. The helmet 10 comprises one or more additional cavities 149, for containing other components that are irrelevant to the present invention (such as speakers).

Therefore, the adaptor which is typically of low cost, simple, and replaceable, provides to the manufacturer of the helmet the freedom with respect to adaptation of the helmet to headphones devices of various shapes, while it also provides the manufacturer of the Bluetooth device the freedom with respect to adaptation of the device to helmets having a helmet cavity of any shape and dimensions. Moreover, devices of various shapes can be easily attached to a given helmet, as long as a suitable adaptor 30 is used.

Therefore, for a given helmet, another adaptor 10 may be necessary for each different headset model. Furthermore, for each device model, another adaptor 10 may be necessary for each specific helmet model. Therefore, when a user wishes to replace a headphone device, he does not need to buy a new helmet with a suitable helmet cavity. Moreover, when the user wishes to replace the helmet, he does not have to have to worry whether this helmet will adapt to his existing headphones device. In both of said cases, only a suitable cheap and simple adaptor has to be replaced.

In one embodiment of the invention, when a need is arisen to remove the headphones device from the helmet, the device 20 is detached from the cavity 19 of adaptor 30, while the adaptor 30 remains attached to the helmet 10 within the helmet cavity 15. In another embodiment, the adaptor 30 may be detached from helmet cavity 15 together with the headphones device 20 which remains within the adaptor cavity 19. The gripping means within the helmet to attach to the adaptor 30 to the helmet, and within the adaptor to attach the adaptor both to the helmet and to the device 20 are standard, and may be of various types.

While some embodiments of the invention have been described by way of illustration, it will be apparent that the invention can be carried out with many modifications variations and adaptations, and with the use of numerous equivalents or alternative solutions that are within the scope of persons skilled in the art, without departing from the spirit of the invention or exceeding the scope of the claims.

The invention claimed is:

1. A method for attaching a replaceable adaptor and a headset device to a helmet, the method comprising:
   inserting a lower portion at a lower level of the adaptor into a helmet cavity provided in an exterior layer of the helmet such that when the adaptor is mounted at the helmet in its operable position the lower portion and the lower level are located deeper within the helmet relative to the exterior layer; and
   inserting the headset device in an adaptor cavity provided in the adaptor, the adaptor cavity conforming to the shape of the headset device.

2. The method of claim 1, further comprising:
   when a need arises to attach another headset device having a different shape or dimensions to the helmet, or when a need arises to replace the helmet by another helmet having a respective helmet cavity of different shape or dimensions, said adaptor is replaced with another adaptor having another adaptor cavity capable of accommodating the another headset device, or having lower portion shape suitable to be accommodated within the respective helmet cavity of the another helmet.

3. The method of claim 1, further comprising:
   passing a connector on the helmet through an opening in the adaptor and mating the connector with a respective connector on the headset device.

4. The method of claim 1, wherein inserting the headset device in the adaptor cavity further includes inserting the headset device in the adaptor cavity, which is provided at a higher level of the adaptor above said lower level.

5. The method of claim 1, wherein the helmet cavity and the adaptor cavity are different in their shape, dimensions, or both.

6. The method of claim 1, further comprising:
   mating a first connector provided at the lower portion of the adaptor with a helmet connector at the helmet cavity.

7. The method of claim 6, further comprising:
   mating a second connector provided at the adaptor cavity with a respective connector at the headset device.

8. The method of claim 1, further comprising:
   passing an electronic connector of the helmet through an opening provided at the adaptor; and
   mating the electronic connector of the helmet with a respective electronic connector of the headset.

* * * * *